United States Patent
Liu et al.

(10) Patent No.: US 12,547,645 B2
(45) Date of Patent: Feb. 10, 2026

(54) SYSTEMS AND METHODS FOR CLASSIFICATION OF DATABASE RECORDS BY MITIGATING BIAS USING RANDOM DATA RE-CENSORING

(71) Applicant: Capital One Services, LLC, McLean, VA (US)

(72) Inventors: Wendi Liu, McLean, VA (US); Xue Li, Lewisville, TX (US); Fei Tong, Allen, TX (US); Bing Liu, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 45 days.

(21) Appl. No.: 18/514,236

(22) Filed: Nov. 20, 2023

(65) Prior Publication Data

US 2025/0165503 A1 May 22, 2025

(51) Int. Cl.
*G06F 16/00* (2019.01)
*G06F 16/11* (2019.01)
(Continued)

(52) U.S. Cl.
CPC .......... *G06F 16/285* (2019.01); *G06F 16/116* (2019.01); *G06F 16/182* (2019.01);
(Continued)

(58) Field of Classification Search
CPC ...... G06F 16/285; G06F 18/24; G06F 18/241; G06F 18/2193; G06F 18/2413; G06F 18/2111; G06F 18/2321; G06F 16/116; G06F 16/16; G06F 16/182; G06F 16/1858; G06F 21/554; G06F 21/561; G06F 21/71; G16H 10/20; G16H 10/60; G16H 10/40; G16H 50/20; G16H 50/30; G16H 50/50;
(Continued)

(56) References Cited

U.S. PATENT DOCUMENTS 9,210,185 B1 * 12/2015 Pinney Wood ....... G06F 21/577
9,463,815 B2 * 10/2016 Hampapur .............. G06F 30/20
(Continued)

FOREIGN PATENT DOCUMENTS

IN 201921042197 A * 4/2021
WO WO2014144602 A1 * 9/2014
(Continued)

OTHER PUBLICATIONS

Victor Benjamin et al., "Time-to-Event Modeling for Predicting Hacker IRC Community Participant Trajectory", 2014 IEEE Joint Intelligence and Security Informatics Conference (2014, pp. 25-32).*
(Continued)

*Primary Examiner* — Srirama Channavajjala
(74) *Attorney, Agent, or Firm* — Foley & Lardner LLP

(57) ABSTRACT

Methods and systems are described herein for improving data processing efficiency of classifying user files in a database. More particularly, methods and systems are described herein for improving data processing efficiency of classifying user files in a database in which the user files have a temporal element. The methods and systems described herein accomplish these improvements by mitigating bias using random data censoring.

16 Claims, 6 Drawing Sheets

(51) Int. Cl.

| | |
|---|---|
| *G06F 16/18* | (2019.01) |
| *G06F 16/182* | (2019.01) |
| *G06F 16/28* | (2019.01) |
| *G06F 18/00* | (2023.01) |
| *G06F 18/21* | (2023.01) |
| *G06F 18/2321* | (2023.01) |
| *G06F 18/241* | (2023.01) |
| *G06F 18/2413* | (2023.01) |
| *G06F 21/55* | (2013.01) |
| *G06F 21/56* | (2013.01) |
| *G06F 21/71* | (2013.01) |

(52) U.S. Cl.
CPC ...... *G06F 16/1858* (2019.01); *G06F 18/2193* (2023.01); *G06F 18/2321* (2023.01); *G06F 18/241* (2023.01); *G06F 18/2413* (2023.01); *G06F 21/554* (2013.01); *G06F 21/561* (2013.01); *G06F 21/71* (2013.01)

(58) Field of Classification Search
CPC ........ G16H 50/80; G06Q 10/10; G06N 20/00; G06N 20/10; G06N 20/20; G06N 5/01; G06N 5/045; G06N 3/08
See application file for complete search history.

(56) References Cited

U.S. PATENT DOCUMENTS

| | | | | |
|---|---|---|---|---|
| 9,986,290 B2* | 5/2018 | Ayers | ................ | H04N 21/436 |
| 10,419,455 B2* | 9/2019 | Park | ................ | G06F 21/57 |
| 10,904,281 B2* | 1/2021 | Choi | ................ | G06F 21/577 |
| 2005/0267850 A1* | 12/2005 | Chen | ................ | G06N 20/00 |
| | | | | 706/924 |
| 2007/0185926 A1* | 8/2007 | Prahlad | ................ | G06F 16/907 |
| 2014/0025354 A1* | 1/2014 | Padullaparthi | ......... | G06Q 10/00 |
| | | | | 703/2 |
| 2014/0283002 A1* | 9/2014 | Frechette | ............ | H04L 63/0281 |
| | | | | 726/12 |
| 2016/0065601 A1* | 3/2016 | Gong | ................ | H04L 63/145 |
| | | | | 726/23 |
| 2017/0331839 A1* | 11/2017 | Park | ................ | G06F 21/55 |
| 2019/0278922 A1* | 9/2019 | Levin | ................ | G06F 21/604 |
| 2019/0373005 A1* | 12/2019 | Bassett | ................ | G06F 21/577 |
| 2020/0106787 A1* | 4/2020 | Galinski | ................ | G06F 21/554 |
| 2020/0351298 A1* | 11/2020 | Paturi | ................ | G06F 21/54 |
| 2021/0342368 A1* | 11/2021 | Lunde | ................ | G06F 16/285 |
| 2022/0108222 A1* | 4/2022 | Brannon | ................ | G06N 20/00 |
| 2023/0078496 A1* | 3/2023 | Wu | ................ | G06F 21/6218 |
| | | | | 726/1 |
| 2023/0319071 A1* | 10/2023 | Durbin | ................ | H04L 63/1466 |
| | | | | 726/23 |
| 2023/0403294 A1* | 12/2023 | Bazalgette | ......... | H04L 63/1441 |

FOREIGN PATENT DOCUMENTS

| | | | |
|---|---|---|---|
| WO | WO2016029142 A1 * | 2/2016 | |
| WO | WO2016154036 A1 * | 9/2016 | |
| WO | WO2017053915 A1 * | 3/2017 | |
| WO | WO 2021026411 A1 * | 2/2021 | |
| WO | WO2021055847 A1 * | 3/2021 | |

OTHER PUBLICATIONS

P. Srinivasa Murthy et al., "Database Forensics and Security Measures to Defend from Cyber Threats", 2020 3rd International Conference on Intelligent Sustainable Systems (ICISS), Jan. 2021, pp.*

* cited by examiner

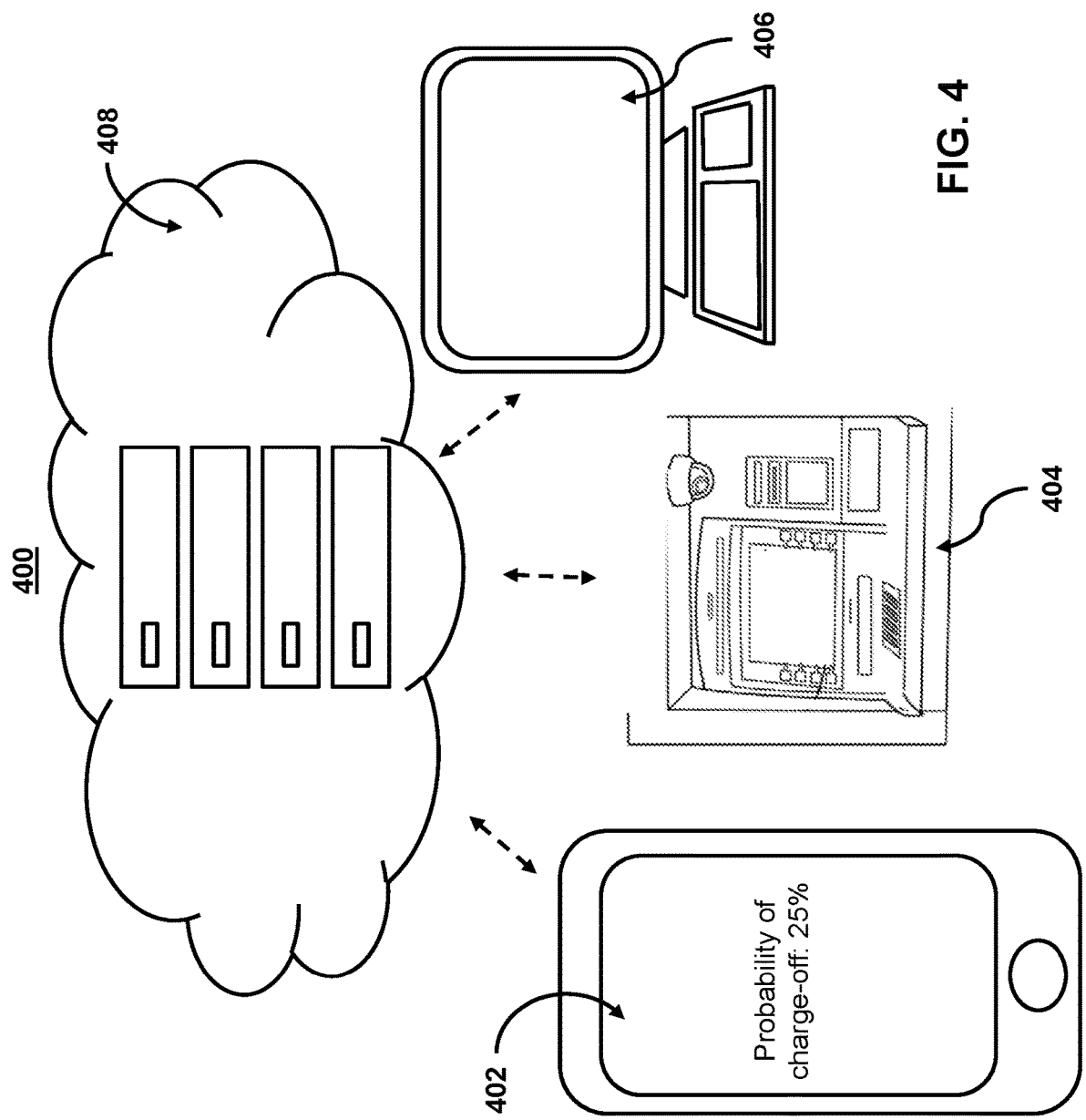

SYSTEMS AND METHODS FOR CLASSIFICATION OF DATABASE RECORDS BY MITIGATING BIAS USING RANDOM DATA RE-CENSORING

BACKGROUND

In recent years, the amount and types of data handled by data processing networks has been exponentially increasing. The efficiency of data processing, particularly in parallel processing environments, for exponentially increasing dataset sizes using cloud-distributed computing architectures is fundamentally limited by the efficiency of the algorithm used to partition that data for distributed storage and processing. For example, properly classifying database records allows for more efficient balancing of domain loads (e.g., by distributing network resources accordingly) by ensuring that each domain is capable of processing its load. Moreover, minimizing the number of network domains may also reduce the chances for network and routing contentions as well as the errors related to misclassification. However, as the number of network domains decreases, the need for properly classifying data into its respective domain increases.

Artificial intelligence, including, but not limited to, machine learning, deep learning, etc. (referred to collectively herein as artificial intelligence models, machine learning models, or simply models) presents one solution for accurately and precisely classifying records. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence for classifying time-series data have been hindered by several technical problems. First, artificial intelligence may rely on large amounts of high-quality data. The process for obtaining this data and ensuring it is of high quality can be complex and time-consuming. Additionally, data that is obtained may need to be categorized and labeled accurately, which can be difficult, time consuming, and a manual task. Second, as time progresses, the high-quality data must be continually refreshed in order to reflect current circumstances. Refreshing this data may include adding new, recently received data, but also deleting expired or old data. When refreshing this training data, a previously trained artificial intelligence solution must be retrained on the refreshed data. Accordingly, there is always a balance between maximizing the amount of available data (e.g., using all data irrespective of age) and limiting bias created by expired or old data.

SUMMARY

Methods and systems are described herein for improving data processing efficiency of classifying user files in a database. More particularly, methods and systems are described herein for improving data processing efficiency of classifying user files in a database in which the user files have a temporal element. For example, data featuring a temporal element (referred to herein as time-series data) is particularly susceptible to the issue of bias in artificial intelligence solutions discussed above. The reason that time-series data is particularly susceptible to this problem is because the artificial intelligence solution trains itself to identify patterns in data to make predictions about a future state of that data. However, as raw training data is received, the effects (or future state) is not yet realized for all the data. That is, more recently received data is less likely to have the effects realized than earlier received data. This creates an inherent bias in the data such that the artificial intelligence solution trains itself to bias earlier received data as more likely to result in a given effect. Moreover, the more dynamic the data (i.e., the more quickly data changes in a given environment), the more likely a given model will have bias.

The systems and methods described herein accomplish these improvements by mitigating bias using random data re-censoring. For example, the system may generate a re-censored record history by re-censoring the user record history based on a set build date. The system may accomplish this by censoring an original (or raw) dataset by randomly censoring an event of interest (e.g., a result of a particular user record state) at a rate that is based on its proximity to the set build date. Thus, the system purposefully makes the training data incomplete (or less complete). Such purposeful denigration of training data would be against conventional approaches as making the training data more incomplete would decrease the accuracy of any model trained thereon. This is particularly true in times-series data, which may include time-dependent covariates. For example, if a prediction relies on determining time-dependent covariates (e.g., patients dropping out of a clinical trial due to worsening health, rates of change being dependent on the length of a time period, etc.), complete information is required to detect these covariates.

To mitigate this loss of information that results from randomly re-censoring the data, the system randomly re-censors based on a set build date. By doing so, the uneven distribution of user records has the effect of weighting different parts of a model's curve toward or against different vintages of data. For example, while randomly re-censored user records that result in a given state before a set build date are uniformly distributed, volumes for vintages having a given state less than the set build date are skewed right as fewer results are likely to be available. This results in more recent vintages having a larger impact on early curve shape, which is more desirable than the converse situation. Accordingly, the advantages on the model's performance outweigh the loss of information that results from randomly re-censoring the data.

In some aspects, systems and methods of improving data processing efficiency of classifying user files in a database into disparate states mitigate bias using random data censoring. For example, the system may receive a request to determine respective probabilities that a user record for a user belongs to each of a plurality of user record states. The system may retrieve a user record history for the user record, wherein the user record history comprises periodic status checks. The system may generate a re-censored record history by re-censoring the user record history based on a set build date. The system may generate a feature input for the user record history based on a respective user record status at each of the periodic status checks that is available in the re-censored record history. The system may process the feature input using a first model. The system may receive a first output of the first model indicating the respective probabilities that the user record for the user belongs to each of the plurality of user record states. The system may generate a recommendation based on the first output.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification, and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 shows illustrative devices for generating outputs related to classifying user files by mitigating bias using random data censoring, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention. It should also be noted that the methods and systems disclosed herein are also suitable for applications unrelated to source code programming.

Figure 1:
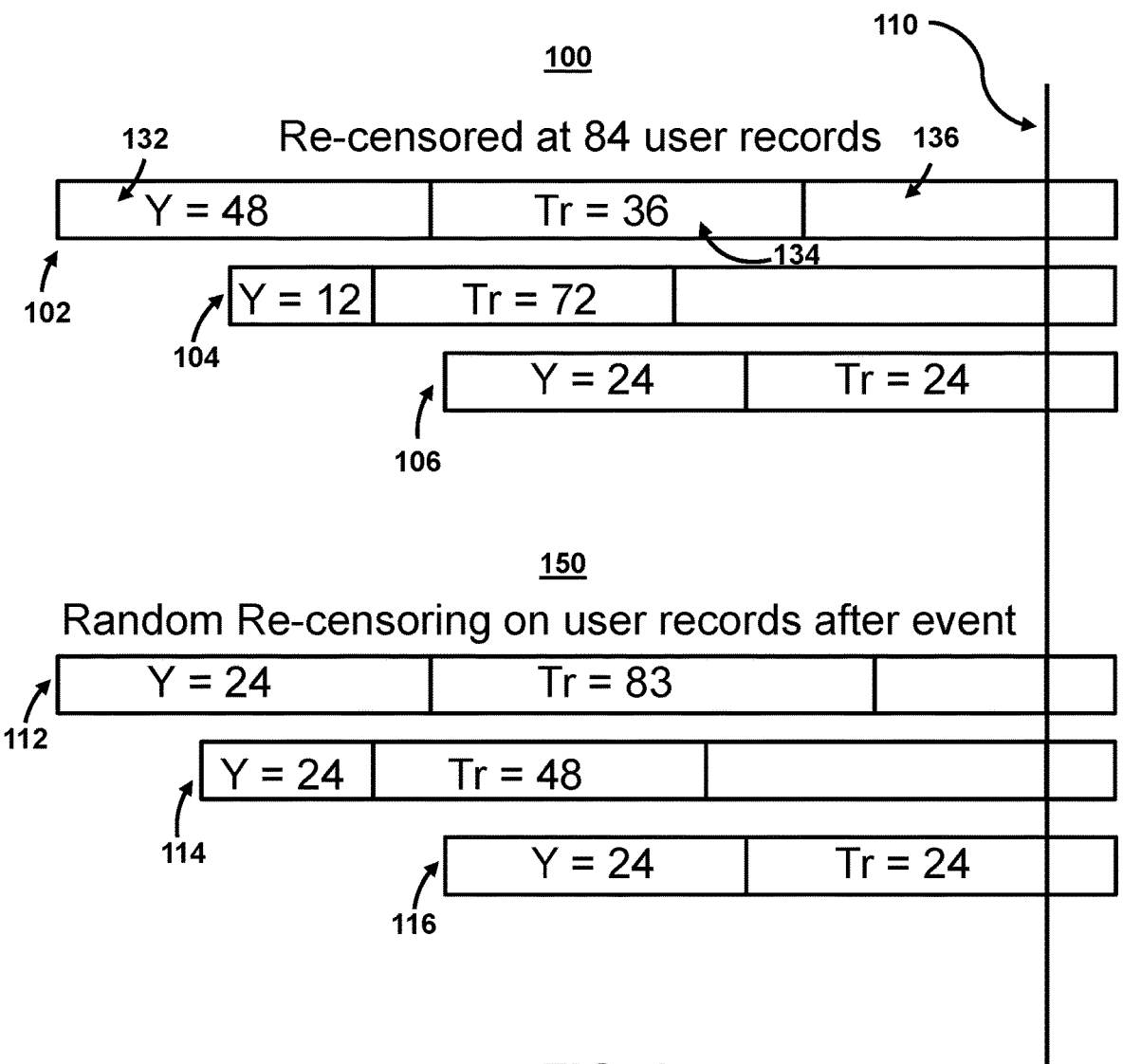
FIG. 1 shows illustrative diagrams of classifying database records by mitigating bias using random data censoring, in accordance with one or more embodiments.

FIG. 1 shows illustrative diagrams of classifying database records by mitigating bias using random data censoring, in accordance with one or more embodiments. For example, FIG. 1 may present diagram 100 and diagram 150. Diagram 100 and diagram 150 may represent time-series data in which diagram 100 represents data that is not re-censored and diagram 150 represents data that features random data re-censoring.

As described herein, "time-series data" may include a sequence of data points that occur in successive order over some period of time. In some embodiments, time-series data may be contrasted with cross-sectional data, which captures a point in time. A time series can be taken on any variable that changes over time. The system may use a time series to track the variable (e.g., price) of an asset (e.g., security) over time. This can be tracked over the short term, such as the price of a security on the hour over the course of a business day, or the long term, such as the price of a security at close on the last day of every month over the course of five years. The system may generate a time-series analysis. For example, a time-series analysis may be useful to see how a given asset, security, or economic variable changes over time. It can also be used to examine how the changes associated with the chosen data point compare to shifts in other variables over the same time period. For example, with regards to retail loss, the system may receive time-series data for the various subsegments indicating daily values for theft, product returns, etc.

The time-series analysis may determine various trends such as a secular trend, which describe the movement along the term, a seasonal variation, which represents seasonal changes, cyclical fluctuations, which correspond to periodical but not seasonal variations, and irregular variations, which are other nonrandom sources of variations of series. The system may maintain correlations for this data during modeling. In particular, the system may maintain correlations through non-normalization as normalizing data inherently changes the underlying data that may render correlations, if any, undetectable and/or lead to the detection of false positive correlations. For example, modeling techniques (and the predictions generated by them), such as rarefying (e.g., resampling as if each sample has the same total counts), total sum scaling (e.g., dividing counts by the sequencing depth), and others, and the performance of some strongly parametric approaches, depends heavily on the normalization choices. Thus, normalization may lead to lower model performance and more model errors. The use of a non-parametric bias test alleviates the need for normalization while still allowing the methods and systems to determine a respective proportion of error detections for each of the plurality of time-series data component models. Through this unconventional arrangement and architecture, the limitations of the conventional systems are overcome. For example, non-parametric bias tests are robust to irregular distributions while providing an allowance for covariate adjustment. Since no distributional assumptions are made, these tests may be applied to data that has been processed under any normalization strategy or not processed under a normalization process at all.

As referred to herein, "a data stream" may refer to data that is received from a data source that is indexed or archived by time. This may include streaming data (e.g., as found in streaming media files) or may refer to data that is received from one or more sources over time (e.g., either continuously or in a sporadic nature). A data stream segment may refer to a state or instance of the data stream. For example, a state or instance may refer to a current set of data corresponding to a given time increment or index value. For example, the system may receive time-series data as a data stream. A given increment (or instance) of the time-series data may correspond to a data stream segment.

For example, in some embodiments, the analysis of time-series data presents comparison challenges that are exacerbated by normalization. For example, a comparison of original data from the same period in each year does not completely remove all seasonal effects. Certain holidays such as Easter and Lunar New Year fall in different periods in each year, hence they will distort observations. Also, year-to-year values will be biased by any changes in seasonal patterns that occur over time. For example, consider a comparison between two consecutive March months (i.e., compare the level of the original series observed in March for 2000 and 2001). This comparison ignores the moving holiday effect of Easter. Easter occurs in April for most years but if Easter falls in March, the level of activity can vary greatly for that month for some series. This distorts the original estimates. A comparison of these two months will not reflect the underlying pattern of the data. The comparison also ignores trading day effects. If the two consecutive months of March have different compositions of trading days, it might reflect different levels of activity in original terms, even though the underlying level of activity is unchanged. In a similar way, any changes to seasonal patterns might also be ignored. The original estimates also contain the influence of the irregular component. If the magnitude of the irregular component of a series is strong compared with the magnitude of the trend component, the underlying direction of the series can be distorted. While data may in some cases be normalized to account for this issue, the normalization of one data stream segment (e.g., for one component model) may affect another data stream segment (e.g., for another component model). Individual normalizations may distort the relationship and correlations between the data leading to issues and negative performance of a composite data model.

As referred to herein, a "modeling error" or simply an "error" may correspond to an error in the performance of the model. For example, an error in a model may comprise an inaccurate or imprecise output or prediction for the model. This inaccuracy or imprecision may manifest as a false positive or a lack of detection of a certain event. These errors may occur in models corresponding to a particular subsegment (e.g., a component model as described herein) that result in inaccuracies for predictions and/or output based on the subsegment, and/or the errors may occur in models corresponding to an aggregation of multiple subsegments that result in inaccuracies for predictions and/or outputs based on errors received in one or more of predictions of the plurality of subsegments and/or an interpretation of the predictions of the plurality of subsegments.

The time series may reflect any content. As referred to herein, "content" should be understood to mean any good, service, and/or electronically consumable user asset, such as internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another but consumed and/or published by the user.

As one example, FIG. 1 may reflect a lending product. For example, accurately predicting the collected collateral value after a loan being charged off at the loan level is an important part of the valuation model for any lending product. Since the raw training data are at the statement level (e.g., loan by statement date), by the time of the model development, not all future collected collateral values have been realized. This creates an inherent bias in the data and if not addressed, the model developed with the data will have bias and misprediction. The system may account for this by using a random data re-censoring method that addresses this technical issue.

As an illustrative example related to a loan, each loan may be randomly re-censored between 0 and the minimum of 84 months after charge-off (e.g., a result and/or effect) and the total number of months between charge-off and the build censoring date. As shown in FIG. 1, diagram 100 may present data for re-censored data at 84 months on book. Diagram 150 represents random re-censoring on months after charge-off. In FIG. 1, "Y" may correspond to a month of charge-off, and "Tr" may correspond to months of recovery performance. For example, diagram 100 includes user record 102, user record 104, and user record 106, each of which may correspond to a respective loan. As shown, user record 102 and user record 104 include a "loan is current" period (e.g., period 132), a "loan is in recovery" period (e.g., period 134), and a "recovery performance that is censored" period (e.g., period 136). FIG. 1 also indicates set build date 110. Diagram 150 includes user record 112, user record 114, and user record 116. Diagram 150 also indicates random re-censoring of user records on months after charge-off.

Diagram 100 reflects the re-censoring data at month on book 84, which stratifies the targets by vintage. The uneven distribution of loans along Tr (month after charge-off) has the effect of weighting different parts of the curve toward or against different vintages. While for random re-censoring, loans that charged off more than 84 months prior to the build censoring date are uniformly distributed along Tr. Volumes for vintages with less than 84 months of possible history are skewed right, as loans with less recovery performance available are increasingly likely to be randomly re-censored at lower Tr. This results in more recent vintages having a larger impact on early curve shape, which is more desirable than the converse situation.

Diagram 100 re-censoring data on month on book also affects the shape of the targets. For example, since there are very few loans that are repossessed immediately in month on book 0, the volume for extreme Tr (month-after-charge-off) is very small. The curve does not monotonically increase as a cumulative distribution should, which does not fit with the assumptions inherent in using a function. The overall volume also shows periodicity in early month-after-charge-off when the volumes are dominated by particular vintages. After random re-censoring, the uniform distribution along Tr for older vintages eliminates the very small volumes at extreme Tr seen using re-censoring on month on book. The curve better fits the asymptotic assumption. The periodicity in volume no longer exists, and volume is moved forward to earlier months on book where the model performance is more important.

The random re-censoring approach has several advantages compared with re-censoring at 84 month on book: the targets are not systematically biased against loans that charge off later, loans are not stratified as strongly by vintage, and the resulting cumulative curve better adheres to the asymptotic assumption of the model (as shown in FIG. 1). These advantages outweigh the loss of information that results from randomly re-censoring the recovery performance data.

Figure 2:
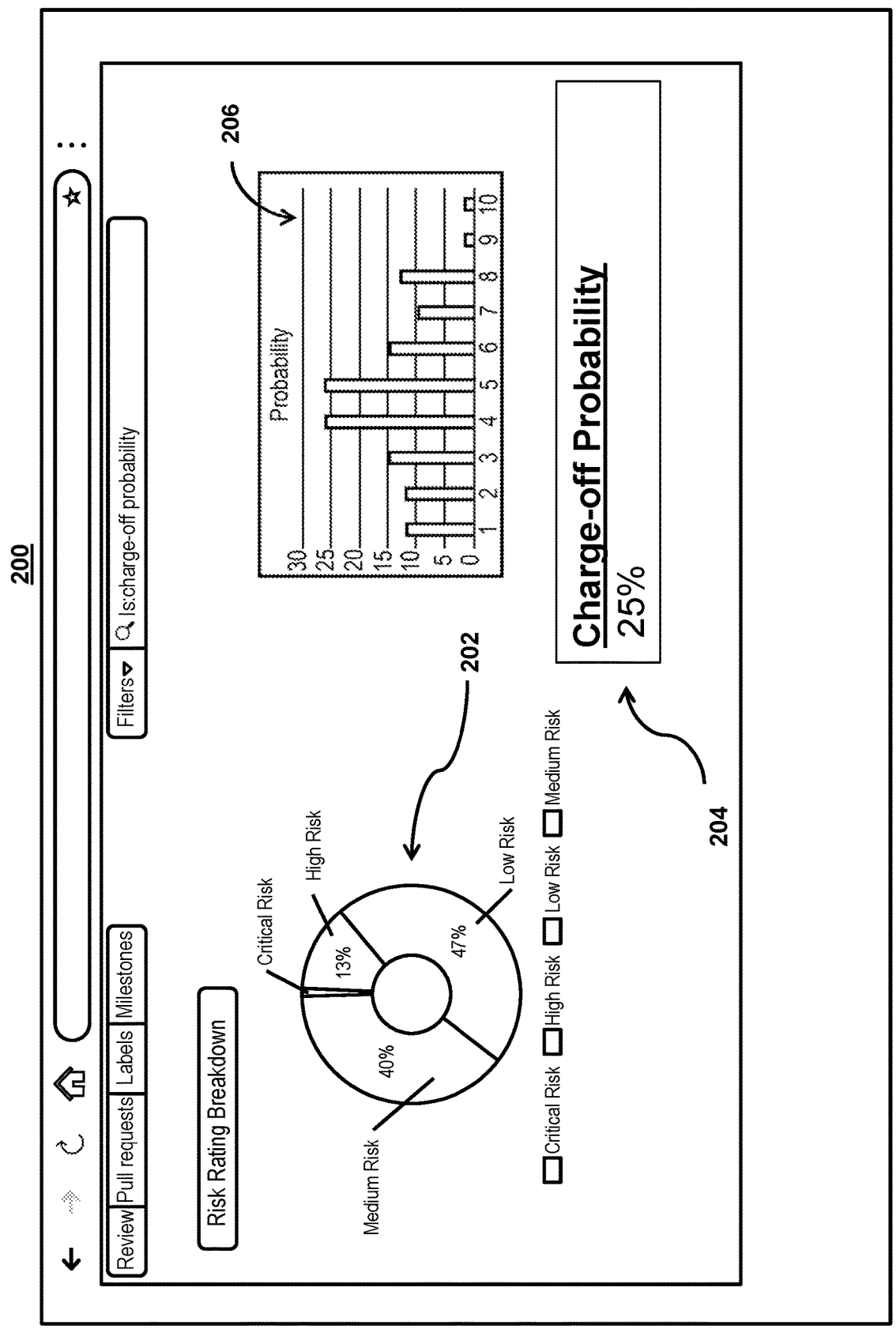
FIG. 2 shows an illustrative user interface for improving data processing efficiency of classifying user files, in accordance with one or more embodiments.

FIG. 2 shows an illustrative user interface for improving data processing efficiency of classifying user files in a database into disparate states by mitigating bias using random data censoring, in accordance with one or more embodiments. For example, user interface 200 may represent a recommendation for classifying user files in a database into disparate states by mitigating bias using random data censoring. For example, graph 202 and graph 206 may include graphical representations of a probability that a user file may be classified into a given state. In another example, icon 204 may represent a textual description of a probability that a user file may be classified into a given state. In some embodiments, user interface 200 may appear on one of the devices shown in FIG. 4 below. As referred to herein, a "user interface" may comprise a human-computer interaction and communication in a device, and may include display screens, keyboards, a mouse, and the appearance of a desktop. For example, a user interface may comprise a way a user interacts with an application or a website.

In some embodiments, the system may classify user files related to predicting the probability that a user account (e.g., a credit card account) may be subject to a charge-off. As described herein, a charge-off may refer to a credit card account that is more than 180 days late on its payment, and the credit issuer (e.g., a financial service provider) may consider the debt uncollectible. In some embodiments, the user account and/or information related to the user account may be retrieved from a user profile. The system may monitor content generated by the user to generate user profile data. As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic. As referred to herein, "a user characteristic" may include information about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be digital representation of a person's identity. The data in the user profile may be generated based on the system actively or passively monitoring a user.

Figure 3A:
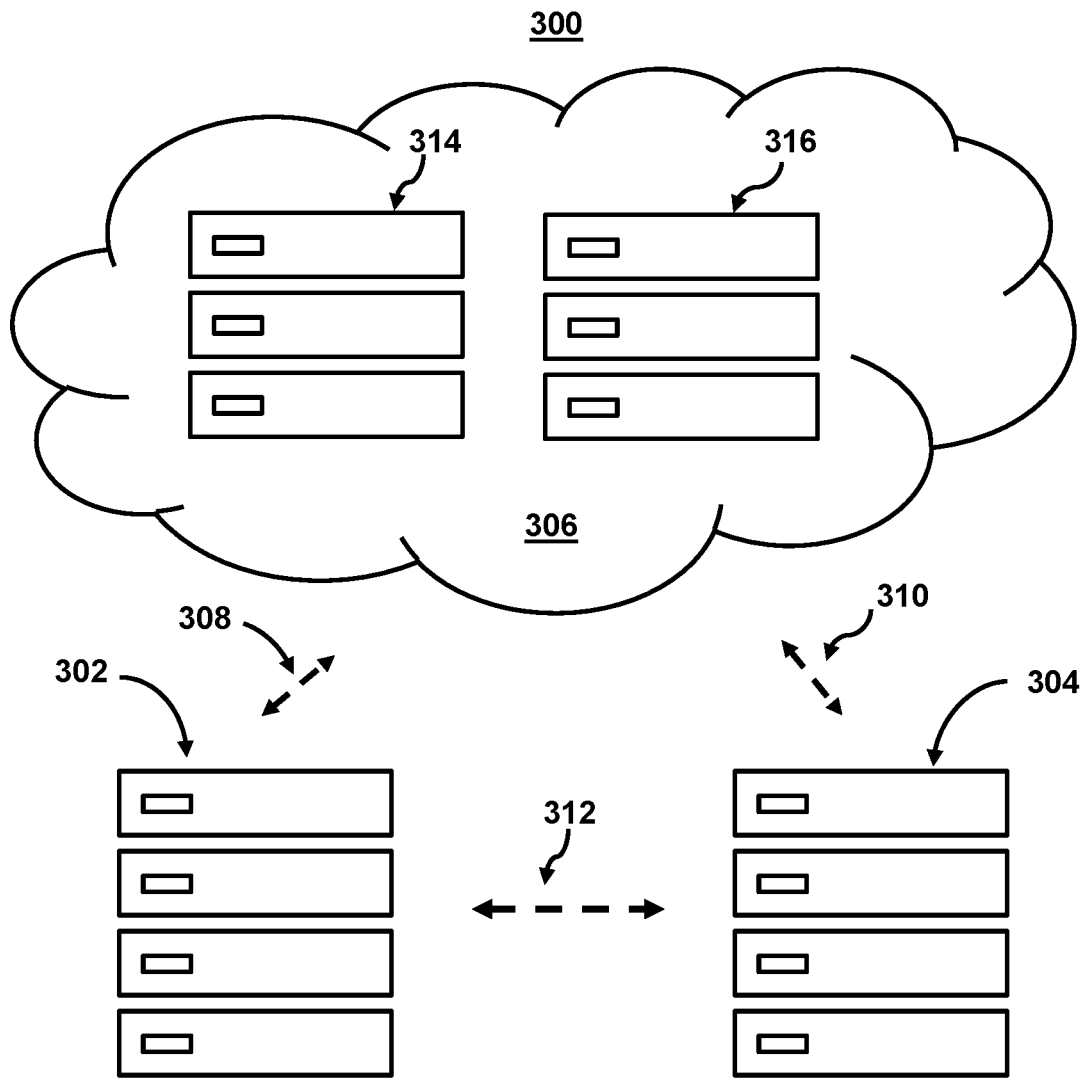
FIG. 3A shows an illustrative system for improving data processing efficiency of classifying user files in a database into disparate states by mitigating bias using random data censoring, in accordance with one or more embodiments.

FIG. 3A shows an illustrative system for improving data processing efficiency of classifying user files in a database into disparate states by mitigating bias using random data censoring, in accordance with one or more embodiments. FIG. 3A shows a system 300 for improving data processing efficiency, in accordance with one or more embodiments. As shown in FIG. 3A, system 300 may include client device 302, client device 304 (or client devices 304a-304n), or other components. Each of client devices 302 and 304 may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. As an example, while one or more operations are described herein as being performed by components of client device 302, those operations may, in some embodiments, be performed by components of client device 304. It should be noted that, although some embodiments are described herein with respect to machine learning models, other prediction models (e.g., statistical models or other analytics models) may be used in lieu of, or in addition to, machine learning models in other embodiments (e.g., a statistical model replacing a machine learning model and a non-statistical model replacing a non-machine-learning model in one or more embodiments).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3A also includes communication paths 308, 310, and 312. Communication paths 308, 310, and 312 may include the internet, a mobile phone network, a mobile voice or data network (e.g., a 5G or LTE network), a cable network, a public switched telephone network, or other types of communications network or combinations of communications networks. Communication paths 308, 310, and 312 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

In FIG. 3A, client device 302 may represent the client device of a first cloud services recipient. For example, the cloud service may be made available to multiple client devices (e.g., end users) on demand via the internet (e.g., path 308 or 310) from a cloud services provider's servers (e.g., server 314 and server 316) as opposed to end users using servers at the end user's location and/or owned by the end user. It should be noted that cloud service 306 includes servers 314 and server 316; however, cloud service 306 may include additional components. In some embodiments, server 314 and server 316 may represent edge servers that are geographically close to a client device. In such embodiments, edge server 314 and edge server 316 may be further connected to a central server in cloud service 306. The central server may assign and select server 314 and/or server 316 to a given client device, application, and/or end user based on the geographic location of the client device with respect to the edge server, based on the network conditions, along a given network path, and/or other quality of service conditions on the network.

Cloud service 306 may be structured according to one or more service-oriented architecture models. For example, cloud service 306 may be designed to provide easy, scalable access to applications, resources, and services and is designed to fully manage cloud services providers. In particular, cloud service 306 may dynamically scale to meet the needs of client device 302 and client device 304. In some embodiments, the cloud service 306 may supply some or all cloud resources (e.g., hardware and software necessary for all or some of the operation of one or more cloud services) to cloud services recipients. The cloud services provider may provide cloud services, such as online data storage and backup solutions, Web-based email services, hosted office suites and document collaboration services, database processing, managed technical support services, and/or general computer power and data processing. In some embodiments, the cloud resource may be a network, server, storage device, application, and/or service.

For example, cloud service 306 may be structured according to an infrastructure as a service (IaaS) model, in which online services that provide high-level APIs used to dereference various low-level details of underlying network infrastructure like physical computing resources, location, data partitioning, scaling, security, backup, etc. In such embodiments, a hypervisor runs the virtual machines as guests, and pools of hypervisors within the cloud operational system can support large numbers of virtual machines and the ability to scale services up and down according to the end users' varying requirements. In such embodiments, the client device may deploy and run arbitrary software, which can include operating systems and applications. While the client device does not manage or control the underlying cloud infrastructure, it may have control over operating systems, storage, and deployed applications. IaaS-cloud providers supply these resources on demand from their large pools of equipment installed in data centers. For wide-area connectivity, customers can use either the internet or carrier clouds (dedicated virtual private networks). To deploy their applications, cloud users install operating system images and their application software on the cloud infrastructure. In this model, the end user patches and maintains the operating systems and the application software, and the end user has access to virtual machines, servers, storage, load balances, etc.

Cloud service 306 may also be structured as a platform as a service (PaaS) model. In such embodiments, cloud service 306 deploys onto the cloud infrastructure consumer-created or acquired applications created using programming languages, libraries, services, and tools supported by the cloud services provider. The end users do not manage or control the underlying cloud infrastructure, including network, servers, operating systems, or storage, but they do have control over the deployed applications and possibly configuration settings for the application-hosting environment. In this model, the end users do not manage or control the underlying cloud infrastructure, including network, servers, operating systems, or storage, but have control over the deployed applications and possibly configuration settings for the application-hosting environment, and the end user has access to execution runtime code, databases, web servers, development tools, etc.

Cloud service 306 may also be structured as a software as a service (SaaS) model. In such embodiments, cloud service 306 allows the end users to use the cloud services provider's applications running on a cloud infrastructure. The applications are accessible from various client devices through either a thin client interface, such as a web browser (e.g., web-based email), or a program interface. The end user does not manage or control the underlying cloud infrastructure, including network, servers, operating systems, storage, or even individual application capabilities, with the possible exception of limited user-specific application configuration settings.

Depending on the model or models used by the cloud services provider, the manner in which cloud services are apportioned may change. For example, in a PaaS model, in order to apportion the cloud service resources, the cloud service 306 may install one or more applications of the first cloud services recipient on hardware of a cloud services provider. In another example, in a SaaS model, in order to apportion the cloud service resources, cloud service 306 may set one or more limits for input/output operations per second for one or more applications of the first cloud services recipient.

It should be noted that in some embodiments, the cloud service may apportion cloud service resources according to those accustomed to other models. For example, as stated below, cloud service 306 may receive output files including specific information that allows cloud service 306 to better predict actual usage of a cloud services recipient, as well as authorized use. Because cloud service 306 is better able to classify user files in a database into disparate states by mitigating bias using random data censoring, cloud service 306 may apportion cloud services using techniques not accustomed to that model. For example, in a SaaS model, cloud service 306 may install one or more applications of the first cloud services recipient on hardware of a cloud services provider. In another example, in a PaaS model, in order to apportion the cloud service resources, cloud service 306 may set one or more limits for input/output operations per second for one or more applications of the first cloud services recipient.

Figure 3B:
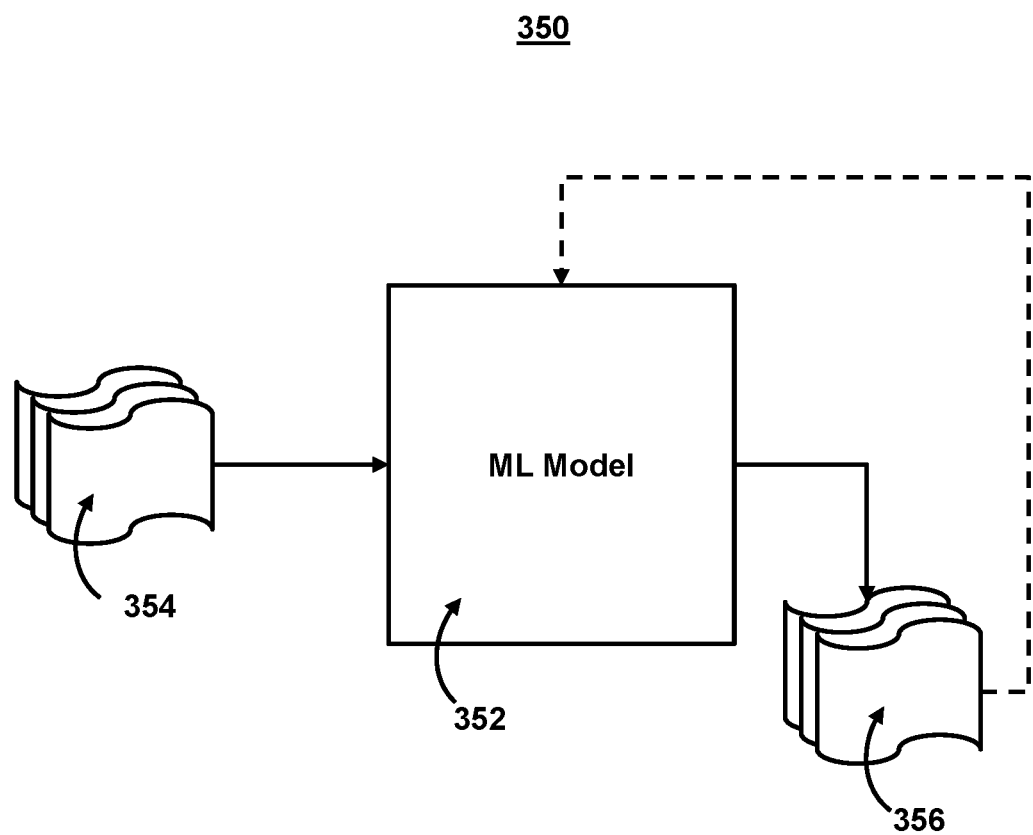
FIG. 3B shows an illustrative model for classifying user files in a database into disparate states by mitigating bias using random data censoring, in accordance with one or more embodiments.

FIG. 3B shows an illustrative machine learning model for classifying user files in a database into disparate states by mitigating bias using random data censoring, in accordance with one or more embodiments. For example, FIG. 3B shows system 350. For example, system 350 may use one or more prediction models to classify user files in a database into disparate states by mitigating bias using random data censoring. In some embodiments, the system may implement time-homogeneous probability models with the time dependency introduced into one or more neural networks, or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function, which combines the values of all of its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free flowing, with connections interacting in a more chaotic and complex fashion.

As an example, with respect to FIG. 3B, machine learning model 352 may take inputs 354 and provide outputs 356. For example, inputs may include information received from output files, such as classified user files that are labeled with the classification. The labeled outputs 356 may be fed back to machine learning model 352 as input to train machine learning model 352 (e.g., alone, or in conjunction with user indications of the accuracy of outputs 356, with labels associated with the inputs, or with other reference feedback information). In another use case, machine learning model 352 may update its configurations (e.g., weights, biases, or other parameters) based on its assessment of its prediction (e.g., outputs 356), and reference feedback information (e.g., user indication of accuracy, reference labels, or other information). In another use case, where machine learning model 352 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 352 may be trained to generate better predictions.

FIG. 4 shows illustrative devices for generating outputs related to classifying user files in a database into disparate states by mitigating bias using random data censoring, in accordance with one or more embodiments. As shown in FIG. 4, system 400 may include mobile device 402, automated teller machine (ATM)_404, and user terminal 406. While shown as a smartphone and personal computer, respectively, in FIG. 4, it should be noted that mobile device 402 and user terminal 406 may be any computing device, including, but not limited to, a laptop computer, a tablet computer, a handheld computer, other computer equipment (e.g., a server), including "smart," wireless, wearable, and/or mobile devices. FIG. 4 also includes server 408. Server 408 may alternatively be any computing device as described above and may include any type of mobile terminal, fixed terminal, or other device. For example, server 408 may be implemented as a cloud computing system and may feature one or more component devices. It should also be noted that system 400 is not limited to three devices. Users may, for instance, utilize one or more other devices to interact with one another, one or more servers, or other components of system 400. It should be noted that, while one or more operations are described herein as being performed by particular components of system 400, those operations may, in some embodiments, be performed by other components of system 400. As an example, while one or more operations are described herein as being performed by components of mobile device 402, those operations may, in some embodiments, be performed by components of server 408.

With respect to the components of mobile device 402, ATM 404, user terminal 406, and server 408, each of these devices may receive content and data via I/O paths. Each of these devices may also include processors and/or control circuitry to send and receive commands, requests, and other suitable data using the I/O paths. The control circuitry may comprise any suitable processing circuitry. Each of these devices may also include a user input interface and/or user output interface (e.g., a display) for use in receiving and displaying data. For example, as shown in FIG. 4, both mobile device 402, ATM 404, and user terminal 406 include a display upon which to display data. Additionally, as mobile device 402, ATM 404, and user terminal 406 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device, such as a remote control, mouse, voice input, etc.). Additionally, the devices in system 400 may run an application (or generate outputs) based on classifying user files in a database into disparate states by mitigating bias using random data censoring. Each of these devices may also include electronic storages as described in relation to FIG. 3A.

Server 408 may be a database configured to store user data for a user. For example, the database may include user data that the system has collected about the user through prior transactions. Alternatively or additionally, the system may act as a clearinghouse for multiple sources of information about the user. Server 408 may also include control circuitry configured to perform the various operations needed to verify the identity of a user through contextual, knowledge-based authentication. For example, server 408 may receive, from mobile device 402, ATM 404, or user terminal 406, an authentication request for a user.

In some embodiments, a request to classify user files in a database into disparate states by mitigating bias using random data censoring may be structured as an API request that includes a URL, body, and method. The API request may correspond to one-half of the API request-response cycle between one or more devices and/or applications to complete the request. For example, the system (e.g., mobile device 402 and server 408) may communicate in HTTP (Hyper Text Transfer Protocol) through a request-response cycle. To make a valid request, the requester (e.g., mobile device 402) may include a URL (Uniform Resource Locator), method, list of headers, and/or body. The URL may indicate to the verification service what resources to use (e.g., "UserFileClassify"). The body may contain headers and data. The headers may provide metadata about the request (e.g., the name of the requester, the user account for which access is needed, etc.) and the body may indicate the name of the user file needing classification.

For example, ATM 404 may be an electronic banking outlet that allows a user to complete basic transactions without the aid of a branch representative or teller. ATM 404 may allow any user with a credit card or debit card to receive cash and/or perform financial actions such as deposits, cash withdrawals, bill payments, and transfers between accounts. Furthermore, ATM 404 may include a card printer and may provide real-time access to credit cards. For example, the system may determine whether or not a user is likely to be subject to a charge-off. If not, the system may approve a credit card application and print a credit card for the user.

Figure 5:
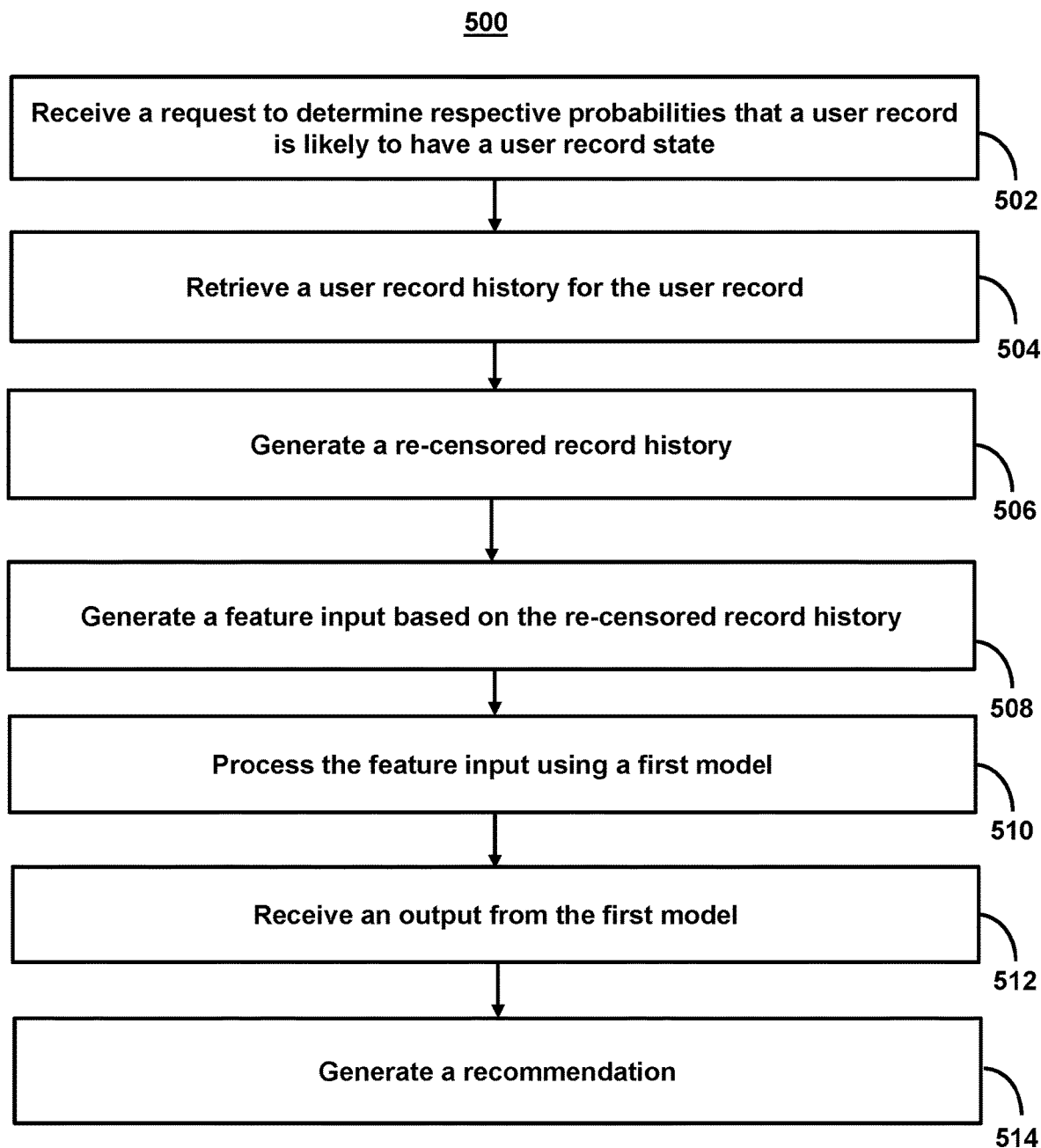
FIG. 5 shows a flowchart of the steps involved in classifying user files in a database by mitigating bias using random data censoring, in accordance with one or more embodiments.

FIG. 5 shows a flowchart of the steps involved in classifying user files in a database by mitigating bias using random data censoring, in accordance with one or more embodiments. For example, process 500 may represent the steps taken by one or more devices as shown in FIGS. 1-4 in processing cyber incidents in classifying user files in a database into disparate states by mitigating bias using random data censoring. For example, in one embodiment, the system may receive a request to determine respective probabilities that a user record for a user belongs to each of a plurality of user record states, wherein the plurality of user record states comprise respective cyber security states.

At step 502, process 500 receives (e.g., via one or more components described herein) a request to determine respective probabilities that a user record is likely to have a user record state. For example, the system may receive a request to determine respective probabilities that a user record for a user belongs to each of a plurality of user record states. For example, the system may receive a request to determine respective probabilities that a credit account for a user belongs to each of a plurality of account states, wherein the plurality of account states includes account states defined by a number of monthly statements for which the credit account has been delinquent.

At step 504, process 500 retrieves (e.g., via one or more components described herein) a user record history for the user record. For example, the system may retrieve a user record history for the user record, wherein the user record history comprises periodic status checks. For example, the system may retrieve an account history for the credit account, wherein the account history comprises the monthly account statements.

At step 506, process 500 generates (e.g., via one or more components described herein) a re-censored record history. For example, the system may generate a re-censored record history by randomly re-censoring the user record history based on a set build date. For example, the system may generate a feature input for the account history based on the respective account status at each monthly statement after randomly censoring.

In some embodiments, generating the re-censored record history by re-censoring the user record history based on the set build date comprises determining a probability that a given data point (e.g., a user record, status check, etc.) is censored based on its proximity to the set build date. To determine the respective proximity of each data point in time-series data to a specific set build date, the system may calculate time-based features or metrics that quantify the time difference between each data point and the set build date. For example, the system may prepare the time-series data for analysis by ensuring that it includes a timestamp or date field associated with each data point. In some embodiments, the system may add timestamps to datapoints in the time-series data. For example, the system may determine the set build date. The system may then determine a re-censoring probability based on a proximity of data in the user record history to the set build date. The system may then determine the respective user record status at each of the periodic status checks that is available based on the proximity.

In some embodiments, to generate the re-censored record history, the system may determine whether to re-censor data (or a probability for re-censoring data) based on a time stamp for a periodic status check. For example, the system may retrieve a time stamp for a first periodic status check of the periodic status checks. The system may compare the time stamp to the set build date to a re-censoring probability for the first periodic status check. For each data point in the time-series data, the system may calculate the time difference or time delta between the data point's timestamp and the set date. The calculation may involve the system subtracting the set date's timestamp from the timestamp of each data point. The calculated time difference may represent the respective proximity of each data point to the set date.

In some embodiments, the system may use a time-dependent re-censoring mechanism to generate the re-censored record history. For example, to perform the random re-censoring (e.g., to a survival analysis to model scenarios where the censoring process is not purely random but influenced by certain factors), the system may allow a user to input (e.g., via user interface 200 (FIG. 2)) different censoring mechanisms or patterns that impact the results of the survival analysis. For example, the system may determine the specific censoring mechanism or pattern to introduce, which could be related to certain covariates, time-dependent factors, and/or external events. To perform random re-censoring, the system may create simulated data that incorporates the chosen censoring mechanism. The system may then modify the censoring status of data points based on the chosen mechanism. For instance, the system may change the censoring status (0 for uncensored, 1 for censored) for specific individuals or time points according to the predefined pattern. This modification may reflect the desired level of non-randomness introduced by the censoring mechanism. After introducing the re-censoring mechanism, the system may perform a survival analysis on the modified dataset.

In some embodiments, the system may modify datapoints in the user record history when applying the re-censoring mechanism. For example, to perform random re-censoring, the system may create simulated data that incorporates the chosen censoring mechanism. The system may then modify the censoring status of data points based on the chosen mechanism. For instance, the system may change the censoring status (0 for uncensored, 1 for censored) for specific individuals or time points according to the predefined pattern. This modification may reflect the desired level of non-randomness introduced by the censoring mechanism. After introducing the re-censoring mechanism, the system may perform a survival analysis on the modified dataset.

In some embodiments, the system may receive a user input and determine the set build date based on the user input. For example, the set build date may correspond to a date that is within a particular time period (e.g., a number of days) from a data cutoff date. For example, the cutoff date should align with the temporal relevance of the problem. If the system is building a predictive model for future events, the cutoff date should be set to a date before which the data is considered "historical" and after which it is considered "future" or "out-of-sample." For example, if the system is predicting stock prices, the cutoff date should be before the current date to ensure future data is not being used to make predictions.

In some embodiments, the system may determine a data cutoff date based on availability of data in the user record history. For example, the system may consider the availability of data up to the chosen cutoff date. The system may ensure that the system has sufficient historical data leading up to that date to train a meaningful model. If the system does not have enough data, the system may need to reconsider the cutoff date or explore other data sources.

In some embodiments, the system may determine a data cutoff date based on availability of data in the user record history. For example, the system may consider the availability of data up to the chosen cutoff date. The system may ensure that the system has sufficient historical data leading up to that date to train a meaningful model. If the system does not have enough data, the system may need to reconsider the cutoff date or explore other data sources.

At step 508, process 500 generates (e.g., via one or more components described herein) a feature input based on the re-censored record history. For example, the system may generate a feature input for the user record history based on a respective user record status at each of the periodic status checks that is available in the re-censored record history. For example, the system may generate a feature input for the account history, after randomly censoring the user record history, based on the respective account status at each monthly statement.

At step 510, process 500 processes (e.g., via one or more components described herein) the feature input using a first model. For example, the system may process the feature input using a first probability model (e.g., a stochastic probability model). For example, the feature input may comprise a row vector that is input into a probability model (as described in relation to FIG. 2 above). In some embodiments, the first model uses transition probability matrices to forecast a probability of an action related to the user record.

In some embodiments, the first model may perform a parametric survival analysis. Parametric survival models are a class of statistical models used in survival analysis, a branch of statistics that deals with time-to-event data. These models assume a specific parametric form for the underlying survival distribution, which describes the probability distribution of the time it takes for an event of interest to occur. The key characteristic of parametric survival models is that they make explicit assumptions about the shape of the survival distribution, typically assuming a specific probability distribution such as exponential, Weibull, log-normal, or others. These models are particularly useful when the assumptions about the shape of the survival distribution are reasonably justified based on prior knowledge or data inspection. The exponential survival model assumes a constant hazard rate over time. This means that the risk of the event occurring remains the same for any given time interval. It is appropriate when the hazard rate is assumed to be constant over time. The Weibull survival model allows for time-varying hazard rates. It has two parameters: the shape parameter (which determines the hazard's shape) and the scale parameter (which affects the rate of events over time). The Weibull distribution can model increasing, decreasing, or constant hazard rates. The log-normal survival model assumes that the natural logarithm of the survival time follows a normal distribution. It is used when the underlying data's logarithms appear to be normally distributed. The gamma survival model assumes a gamma distribution for the survival times. It has two parameters: shape and scale, allowing for flexibility in modeling survival data. The log-logistic model is suitable for data where the hazard rate initially increases and then decreases or plateaus. It has two parameters: shape and scale. The Gompertz survival model is often used for modeling mortality rates in demography. It assumes a time-dependent hazard rate that increases exponentially with time.

In some embodiments, the first model may perform a Kaplan-Meier curve analysis. The Kaplan-Meier curve is a graphical representation of survival analysis data, specifically designed to estimate and visualize the survival probability or survival function over time in the presence of censored data. Survival analysis is a statistical method used to analyze the time-to-event data, where the event of interest could be, for example, the failure of a machine, the occurrence of a disease, or the death of a patient. The Kaplan-Meier curve is particularly useful for comparing survival probabilities between different groups or categories in the data, such as treatment vs. control groups in a clinical trial or subpopulations with different characteristics. Log-rank tests or other statistical tests can be used to compare these survival curves to determine if there are significant differences in survival probabilities between groups.

To perform the Kaplan-Meier curve analysis, the system may retrieve the re-censored record history dataset that includes information on the time until an event (time-to-event data) and the status of each observation, which is typically binary, indicating whether the event of interest occurred (event) or not (censored). Predictor variables (covariates or independent variables) are variables that may influence the hazard rate. The system may run the Cox proportional hazards regression to estimate the coefficients (beta values) for each predictor variable. These coefficients represent the log-hazard ratio for each predictor.

In some embodiments, the first model may perform a Cox proportional hazards regression. Performing a Cox proportional hazards regression is a statistical analysis used to assess the relationship between one or more predictor variables and the hazard rate (risk of an event) in survival data. The time-to-event variable (often denoted as "time" or "survival time") represents the time it takes for the event of interest to occur. The event status variable (often denoted as "event" or "censoring") is binary, with 1 indicating that the event occurred and 0 indicating censoring.

At step 512, process 500 receives (e.g., via one or more components described herein) an output from the first model. For example, the system may receive a first output of the first model indicating the respective probabilities that the user record for the user belongs to each of the plurality of user record states. For example, the system may receive a first output of the first model indicating a probability that the credit account to the user belongs is likely to be subject to a charge-off. In some embodiments, the first output may be a probability distribution row vector.

At step 514, process 500 generates (e.g., via one or more components described herein) a recommendation. For example, the system may generate a recommendation based on the first output. For example, the system may generate a recommendation for whether or not to issue a credit account to a user.

In some embodiments, the system may select a second stochastic probability model of the plurality of stochastic probability models based on the number of the periodic status checks in the user record history corresponding to a second range. For example, the second range may correspond to a number greater than 11. The system may then process the feature input using the second stochastic probability model. The system may then receive a second output of the second stochastic probability model, indicating the respective probabilities that the user record belongs to each of the plurality of user record states. The system may then generate a recommendation based on the second output.

It is contemplated that the steps or descriptions of FIG. 5 may be used with any other embodiment of this disclosure. In addition, the steps and descriptions described in relation to FIG. 5 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-4 could be used to perform one or more of the steps in FIG. 5.

The above-described embodiments of the present disclosure are presented for purposes of illustration, and not of limitation, and the present disclosure is limited only by the claims that follow. Furthermore, it should be noted that the features and limitations described in any one embodiment may be applied to any other embodiment herein, and flow-charts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for improving data processing efficiency of classifying user files in a database into cyber security states by mitigating bias using random data censoring.

2. A method for improving data processing efficiency of classifying user files in a database into disparate states by mitigating bias using random data censoring.
3. A method of any one of the preceding embodiments, the method comprising: receiving a request to determine respective probabilities that a user record for a user belongs to each of a plurality of user record states, wherein the plurality of user record states comprise respective cyber security states; retrieving a user record history for the user record, wherein the user record history comprises periodic status checks, wherein each of the periodic status checks comprises a determination of a status of the user record; determining the set build date; determining a re-censoring probability based on a proximity of data in the user record history to the set build date; determining the respective user record status at each of the periodic status checks that is available based on the proximity; generating a re-censored record history based on the respective user record status at each of the periodic status checks that is available; processing the re-censored record history using a first model, wherein the first model comprises a survival analysis; receiving a first output of the first model indicating the respective probabilities that the user record for the user belongs to each of the plurality of user record states; and generating a cyber security recommendation based on the first output.
4. The method of any one of the preceding embodiments, the method comprising: receiving a request to determine respective probabilities that a user record for a user belongs to each of a plurality of user record states; retrieving a user record history for the user record, wherein the user record history comprises periodic status checks; generating a re-censored record history by re-censoring the user record history based on a set build date; generating a feature input for the user record history based on a respective user record status at each of the periodic status checks that is available in the re-censored record history; processing the feature input using a first model; receiving a first output of the first model indicating the respective probabilities that the user record for the user belongs to each of the plurality of user record states; and generating a recommendation based on the first output.
5. The method of any one of the preceding embodiments, wherein generating the re-censored record history by re-censoring the user record history based on the set build date comprises: determining the set build date; determining a re-censoring probability based on a proximity of data in the user record history to the set build date; and determining the respective user record status at each of the periodic status checks that is available based on the proximity.
6. The method of any one of the preceding embodiments, wherein generating the re-censored record history by re-censoring the user record history based on the set build date comprises: retrieving a time stamp for a first periodic status check of the periodic status checks; and comparing the time stamp to the set build date to a re-censoring probability for the first periodic status check.
7. The method of any one of the preceding embodiments, wherein generating the re-censored record history by re-censoring the user record history based on the set build date comprises: receiving a user input of a data cutoff date; and determining the set build date prior to the data cutoff date.
8. The method of any one of the preceding embodiments, wherein generating the re-censored record history by re-censoring the user record history based on the set build date comprises: determining an availability of data in the user record history; determining a data cutoff date based on the availability of data; and determining the set build date prior to the data cutoff date.
9. The method of any one of the preceding embodiments, wherein generating the re-censored record history by re-censoring the user record history based on the set build date comprises: determining a data cutoff date based on stationarity of data in the user record history; determining the data cutoff date based on the stationarity of data; and determining the set build date prior to the data cutoff date.
10. The method of any one of the preceding embodiments, further comprising: determining a number of the periodic status checks in the user record history; and selecting the first model from a plurality of models based on the number of the periodic status checks in the user record history corresponding to a first range.
11. The method of any one of the preceding embodiments, wherein generating the re-censored record history by re-censoring the user record history based on the set build date further comprises: receiving a user input of a time-dependent re-censoring mechanism; and applying the time-dependent re-censoring mechanism to the user record history.
12. The method of any one of the preceding embodiments, wherein applying the time-dependent re-censoring mechanism to the user record history further comprises: receiving a first datapoint in the user record history; and setting an event status for the first datapoint based on the re-censoring mechanism.
13. The method of any one of the preceding embodiments, wherein processing the feature input using the first model further comprises: applying a parametric survival analysis to the feature input; and determining the first output based on the parametric survival analysis.
14. The method of any one of the preceding embodiments, wherein processing the feature input using the first model further comprises: applying a Kaplan-Meier curve analysis to the feature input; and determining the first output based on the Kaplan-Meier curve analysis.
15. The method of any one of the preceding embodiments, wherein processing the feature input using the first model further comprises: applying a Cox proportional hazards regression to the feature input; and determining the first output based on the Cox proportional hazards regression.
16. The method of any one of the preceding embodiments, wherein the model is a stochastic probability model comprising a Markov chain.
17. The method of any one of the preceding embodiments, wherein the first model uses transition probability matrices to forecast a probability of an action related to the user record.
18. The method of any one of the preceding embodiments, wherein the first output is a probability distribution row vector.
19. The method of any one of the preceding embodiments, wherein the plurality of user record states comprises a user record state corresponding to a charge-off of the user record.
20. The method of any one of the preceding embodiments, the method comprising: receiving a request to determine respective probabilities that a user record for a user belongs to each of a plurality of user record states; retrieving a user record history for the user record, wherein the user record history comprises periodic status checks; generating a re-censored record history by re-censoring the user record history based on a set build date; processing the re-censored record history using a first model, wherein the first model comprises a survival analysis; receiving a first output of the first model indicating the respective probabilities that the user record for the user belongs to each of the plurality of user record states; and generating a cyber security recommendation based on the first output.

21. The method of any one of the preceding embodiments, wherein generating the re-censored record history by re-censoring the user record history based on the set build date comprises: determining the set build date; and determining a re-censoring probability based on a proximity of data in the user record history to the set build date.

22. The method of any one of the preceding embodiments, wherein generating the re-censored record history by re-censoring the user record history based on the set build date comprises: retrieving a time stamp for a first periodic status check of the periodic status checks; and comparing the time stamp to the set build date to a re-censoring probability for the first periodic status check.

23. A system comprising: one or more processors; and memory storing instructions that, when executed by the processors, cause the processors to effectuate operations comprising those of any of embodiments 1-22.

22. A system comprising means for performing any of embodiments 1-22.

23. A system comprising cloud-based circuitry for performing any of embodiments 1-22.

What is claimed is:

1. A system for classifying user files in a database into disparate states by mitigating bias using random data censoring, the system comprising:
one or more processors; and
a non-transitory, computer-readable medium comprising instructions that when executed by the one or more processors cause operations comprising:
receiving a request to determine respective probabilities that a user record for a user belongs to each of a plurality of user record states;
retrieving a user record history for the user record, wherein the user record history comprises periodic status checks, wherein each of the periodic status checks comprises a status check date;
determining that the user record history comprises a bias associated with the periodic status checks;
in response to determining that the user record history comprises a bias, generating a re-censored record history by randomly re-censoring the user record history based on a set build date, wherein generating the re-censored record history by re-censoring the user record history based on the set build date comprises:
determining the set build date based on an availability of data in the user record history;
determining a respective periodic status check proximity at each of the periodic status checks by:
retrieving a time stamp for each periodic status check of the periodic status checks; and
comparing the time stamp to the set build date;
determining a respective re-censoring probability at each of the periodic status checks based on the respective periodic status check proximity; and
determining whether a respective user record status at each of the periodic status checks is available based on the respective periodic status check proximity;
generating a feature input for the user record history based on the respective user record status at each of the periodic status checks that is available in the re-censored record history;
processing the feature input using a first model;
receiving a first output of the first model indicating the respective probabilities that the user record for the user belongs to each of the plurality of user record states; and
generating a recommendation based on the first output.

2. A method of classifying user files in a database into disparate states by mitigating bias using random data censoring, the method comprising:
receiving a request to determine respective probabilities that a user record for a user belongs to each of a plurality of user record states;
retrieving a user record history for the user record, wherein the user record history comprises periodic status checks, wherein each of the periodic status checks comprises a status check date;
determining that the user record history comprises a bias associated with the periodic status checks;
in response to determining that the user record history comprises a bias, generating a re-censored record history by randomly re-censoring the user record history based on a set build date, wherein generating the re-censored record history by re-censoring the user record history based on the set build date comprises:
determining the set build date based on an availability of data in the user record history;
determining a respective periodic status check proximity at each of the periodic status checks by:
retrieving a time stamp for each periodic status check of the periodic status checks; and
comparing the time stamp to the set build date;
determining a respective re-censoring probability at each of the periodic status checks based on the respective periodic status check proximity; and
determining whether a respective user record status at each of the periodic status checks is available based on the respective periodic status check proximity;
generating a feature input for the user record history based on the respective user record status at each of the periodic status checks that is available in the re-censored record history;
processing the feature input using a first model;
receiving a first output of the first model indicating the respective probabilities that the user record for the user belongs to each of the plurality of user record states; and
generating a recommendation based on the first output.

3. The method of claim 2, wherein generating the re-censored record history by re-censoring the user record history based on the set build date further comprises:
receiving a user input of a data cutoff date; and
determining the set build date prior to the data cutoff date.

4. The method of claim 2, wherein generating the re-censored record history by re-censoring the user record history based on the set build date further comprises:
determining an availability of data in the user record history;

determining a data cutoff date based on the availability of data; and determining the set build date prior to the data cutoff date.

5. The method of claim 2, wherein generating the re-censored record history by re-censoring the user record history based on the set build date further comprises:

determining a data cutoff date based on stationarity of data in the user record history;

determining the data cutoff date based on the stationarity of data; and determining the set build date prior to the data cutoff date.

6. The method of claim 2, further comprising:

determining a number of the periodic status checks in the user record history; and selecting the first model from a plurality of models based on the number of the periodic status checks in the user record history corresponding to a first range.

7. The method of claim 2, wherein generating the re-censored record history by re-censoring the user record history based on the set build date further comprises:

receiving a user input of a time-dependent re-censoring mechanism; and applying the time-dependent re-censoring mechanism to the user record history.

8. The method of claim 7, wherein applying the time-dependent re-censoring mechanism to the user record history further comprises:

receiving a first datapoint in the user record history; and setting an event status for the first datapoint based on the time-dependent re-censoring mechanism.

9. The method of claim 2, wherein processing the feature input using the first model further comprises:

applying a parametric survival analysis to the feature input; and determining the first output based on the parametric survival analysis.

10. The method of claim 2, wherein processing the feature input using the first model further comprises:

applying a Kaplan-Meier curve analysis to the feature input; and determining the first output based on the Kaplan-Meier curve analysis.

11. The method of claim 2, wherein processing the feature input using the first model further comprises:

applying a Cox proportional hazards regression to the feature input; and determining the first output based on the Cox proportional hazards regression.

12. The method of claim 2, wherein the first model is a stochastic probability model comprising a Markov chain.

13. The method of claim 2, wherein the first model uses transition probability matrices to forecast a probability of an action related to the user record.

14. The method of claim 2, wherein the first output is a probability distribution row vector.

15. The method of claim 2, wherein the plurality of user record states comprises a user record state corresponding to a charge-off of the user record.

16. One or more non-transitory, computer-readable mediums comprising instructions that, when executed by one or more processors, cause operations comprising:

receiving a request to determine respective probabilities that a user record for a user belongs to each of a plurality of user record states;

retrieving a user record history for the user record, wherein the user record history comprises periodic status checks, wherein each of the periodic status checks comprises a status check date;

determining that the user record history comprises a bias associated with the periodic status checks;

in response to determining that the user record history comprises a bias, generating a re-censored record history by re-censoring the user record history based on a set build date, wherein generating the re-censored record history by re-censoring the user record history based on the set build date comprises:

determining the set build date based on an availability of data in the user record history;

determining a respective periodic status check proximity at each of the periodic status checks by:

retrieving a time stamp for each periodic status check of the periodic status checks; and comparing the time stamp to the set build date;

determining a respective re-censoring probability at each of the periodic status checks based on the respective periodic status check proximity; and determining whether a respective user record status at each of the periodic status checks is available based on the respective periodic status check proximity;

generating a feature input for the user record history based on the respective user record status at each of the periodic status checks that is available in the re-censored record history;

processing the feature input using a first model;

receiving a first output of the first model indicating the respective probabilities that the user record for the user belongs to each of the plurality of user record states; and generating a recommendation based on the first output.

* * * * *